UNITED STATES PATENT OFFICE.

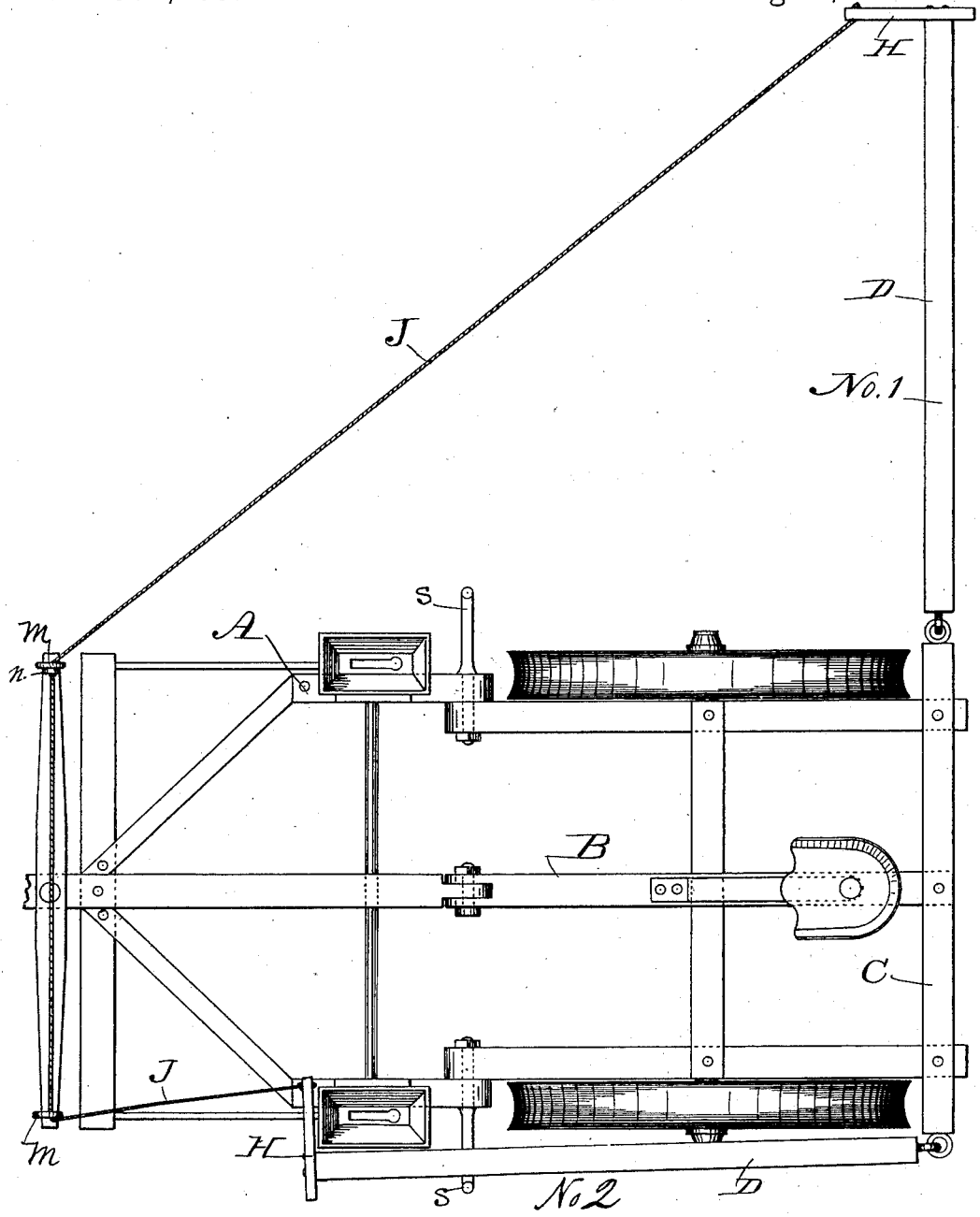

WOODMAN THOMPSON, OF IRETON, IOWA.

MARKING ATTACHMENT FOR CORN-PLANTERS.

SPECIFICATION forming part of Letters Patent No. 367,468, dated August 2, 1887.

Application filed May 19, 1887. Serial No. 238,722. (No model.)

*To all whom it may concern:*

Be it known that I, WOODMAN THOMPSON, a citizen of the United States of America, and a resident of Ireton, in the county of Sioux and State of Iowa, have invented an Improved Land-Marking Attachment for Corn-Planters, of which the following is a specification.

My object is to facilitate the planting of parallel straight equidistant rows in a field; and my invention consists in the combination of two adjustable markers with the carriage of a planter, as hereinafter set forth, pointed out in my claims, and illustrated in the accompanying drawing, in which the figure illustrates a plan view of the machine.

A represents the runner-frame and front portion of the carriage, hinged to the frame of the rear portion, B, that is mounted upon wheels.

Nos. 1 and 2 are markers of common form, hinged to the opposite ends of a cross-piece, C, on the rear end of the carriage in such a manner that they can be extended laterally at right angles from the carriage, and also brought into parallel position with the side of the carriage.

The beams D, to which the runners H are fixed, are long enough to advance the runners in parallel lines with the runners of the planter-carriage, and far enough distant to mark a line that will be a central guide over which to advance the horses and carriage on a return-trip across the field, as required to plant parallel rows at equidistances apart without setting stakes or any other kind of previous marking.

J is a rope passed through eyes m on the ends of the doubletree and fastened at its opposite ends to the runners H.

n represents a knot or ring or other suitable stop device on the central portion of the rope, that will restrict the passage of the rope through the eyes m, as required to stretch it and to transmit power direct from the doubletree to the runner when the beam D is extended at right angles and the runner in proper position for marking.

While one runner is in position for marking the other runner is in parallel position with the line of advance and supported upon a rod or bar, s, that projects laterally from the top portion of the runner-frame of the planter, as shown in the drawing, or in any suitable way adapting it to support the beam D and marker H in an elevated and inoperative position, as required when the other beam and marker is extended and in an operative position. At the end of each trip across a field, and before starting on a return-trip, I shift the positions of the two markers, as required to bring them alternately into use on the outside of the planted portion of the field.

I am aware that bars having runners on their ends have been connected with a planter-carriage in such a manner that the bars could be moved longitudinally and vertically and projected horizontally, so that the runners would mark the ground for the purposes stated; but my manner of hinging beams to the carriage and connecting them by means of a cord, so that they can be joint-adjusted, one extended at right angles and the other parallel with the carriage, and alternately used without disconnecting them, is novel and advantageous.

I claim as my invention—

1. The improved marking attachment for corn-planters, comprising two beams having fixed runners or markers on their ends hinged to the opposite sides of the rear end of the planter-carriage, a rope fixed to the front ends of the said marking-runners and extended through eyes fixed to the ends of a doubletree, and a stop device on the central portion of the rope, to operate in the manner set forth.

2. The markers Nos. 1 and 2, hinged to the rear corners of a planter-carriage, the rope J, having a stop device, n, a doubletree having eyes m on its ends, and supports s, fixed to the runner-frame of the planter-carriage, arranged and combined to operate in the manner set forth, for the purposes stated.

WOODMAN THOMPSON.

Witnesses:
 J. MCKEEVER,
 S. M. BLOCH.